United States Patent
Chang et al.

(10) Patent No.: US 9,740,920 B1
(45) Date of Patent: Aug. 22, 2017

(54) SYSTEMS AND METHODS FOR SECURELY AUTHENTICATING USERS VIA FACIAL RECOGNITION

(71) Applicant: Symantec Corporation, Mountain View, CA (US)

(72) Inventors: Andrew Chang, Pelham, NH (US); Ilya Sokolov, Boston, MA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/849,622

(22) Filed: Sep. 10, 2015

(51) Int. Cl.
*G06K 9/00* (2006.01)
*H04L 9/32* (2006.01)

(52) U.S. Cl.
CPC ........ *G06K 9/00288* (2013.01); *H04L 9/3231* (2013.01)

(58) Field of Classification Search
CPC ........................... G06K 9/00288; H04L 9/3231
USPC ......................................................... 382/118
See application file for complete search history.

(56) References Cited

U.S. PATENT DOCUMENTS

| | | | | |
|---|---|---|---|---|
| 7,260,724 B1* | 8/2007 | Dickinson | ............... | H04L 63/08 713/182 |
| 9,152,837 B2* | 10/2015 | Matos | ...................... | G06K 9/00 |
| 9,391,782 B1* | 7/2016 | Mironenko | ........... | H04L 9/3247 |
| 2012/0140993 A1* | 6/2012 | Bruso | ................ | G06K 9/00899 382/118 |
| 2012/0314048 A1* | 12/2012 | Matos | ...................... | G06K 9/00 348/78 |
| 2014/0298421 A1* | 10/2014 | Johnson | ................ | H04L 63/083 726/4 |
| 2015/0248495 A1* | 9/2015 | Nii | ..................... | G06Q 10/0875 707/722 |

OTHER PUBLICATIONS

Abkowitz, Wrong Number? Blame Companies' Recycling, Dec. 1, 2011, Wall Street Journal.*
"Symantec O3", https://www.symantec.com/page.jsp?id=O3, as accessed Jul. 24, 2015, (Apr. 4, 2013).
"Symantec Validation and ID Protection Service (VIP)", https://www.symantec.com/vip-authentication-service/, as accessed Jul. 24, 2015, (Feb. 10, 2014).
(Continued)

*Primary Examiner* — John Strege
(74) *Attorney, Agent, or Firm* — FisherBroyles LLP

(57) ABSTRACT

The disclosed computer-implemented method for securely authenticating users via facial recognition may include (1) identifying a request from a user to complete an authentication process on the computing device via a facial-recognition system, (2) sending the user a randomized unique identifier to display to a camera on the computing device, (3) simultaneously observing, via the camera on the computing device, both the user and the randomized unique identifier that was sent to the user, and (4) authenticating the observed user in response to determining both that the observed user's facial characteristics match facial characteristics of the user stored in the facial-recognition system and that the observed randomized unique identifier matches the randomized unique identifier sent to the user. Various other methods, systems, and computer-readable media are also disclosed.

20 Claims, 7 Drawing Sheets

(56) References Cited

OTHER PUBLICATIONS

"Welcome to Norton", https://login.norton.com/sso/embedded/update, as accessed Jul. 24, 2015, (Sep. 22, 2013).
Scott Schneider, et al.; Systems and Methods for Enabling Biometric Authentication Options; U.S. Appl. No. 14/178,276, filed Feb. 12, 2014.

* cited by examiner

SYSTEMS AND METHODS FOR SECURELY AUTHENTICATING USERS VIA FACIAL RECOGNITION

BACKGROUND

Security is often described as a continuum between convenience and safety. A system that requires ten layers of authentication may be very difficult to attack, but it may also be so inconvenient that it will never be used. At the opposite end, a system with no means of authentication or authorization is highly convenient for users but also highly insecure. Biometric authentication holds the possibility of creating security systems that are both strong and convenient. For example, swiping a fingerprint reader and staring into a camera are convenient actions for a user that are also difficult for malicious actors to fake. However, malicious actors are nothing if not persistent, and a variety of methods of faking biometric authentication methods have emerged. In some instances, attackers may record an image of a user and later display the image to authenticate to the user's account via facial recognition systems.

Traditional systems for authenticating via facial recognition often have no safeguards against such attacks. Some traditional systems may perform checks to determine whether an image observed by the camera is a still image or a video, but these checks can be circumvented by recording and replaying a video of the user rather than an image. Accordingly, the instant disclosure identifies and addresses a need for additional and improved systems and methods for securely authenticating users via facial recognition.

SUMMARY

As will be described in greater detail below, the instant disclosure describes various systems and methods for securely authenticating users via facial recognition by providing the user with a randomized unique identifier and only authenticating the user if the authentication system recognizes both the user's face and the randomized unique identifier sent as part of the current authentication attempt.

In one example, a computer-implemented method for securely authenticating users via facial recognition may include (1) identifying a request from a user to complete an authentication process on the computing device via a facial-recognition system, (2) sending the user a randomized unique identifier to display to a camera on the computing device, (3) simultaneously observing, via the camera on the computing device, both the user and the randomized unique identifier that was sent to the user, and (4) authenticating the observed user in response to determining both that the observed user's facial characteristics match facial characteristics of the user stored in the facial-recognition system and that the observed randomized unique identifier matches the randomized unique identifier sent to the user.

In one embodiment, the computer-implemented method may further include expiring the randomized unique identifier after a predetermined period of time and failing to authenticate the observed user in response to determining that the randomized unique identifier has expired.

In some embodiments, the computer-implemented method may further include storing a representation of the randomized unique identifier in a stored set of representations of previously sent randomized unique identifiers. In these embodiments, sending the user the randomized unique identifier may include checking the representation of the randomized unique identifier against the stored set of representations of previously sent randomized unique identifiers in order to avoid re-sending a previously sent randomized unique identifier. In some examples, the computer-implemented method may further include removing the representation of the randomized unique identifier from the stored set of previously sent randomized unique identifiers after a predetermined period of time has passed since the randomized unique identifier was sent to the user.

In one embodiment, the randomized unique identifier may include an image and/or a video and sending the user the randomized unique identifier may include displaying the image or the video on an additional computing device in proximity to the user. In this embodiment, observing both the user and the randomized unique identifier may include observing the image or the video displayed on the additional computing device.

Additionally or alternatively, the randomized unique identifier may include a gesture and sending the user the randomized unique identifier may include sending the user instructions for performing the gesture. In this embodiment, observing both the user and the randomized unique identifier may include observing the user performing the gesture.

In one embodiment, a system for implementing the above-described method may include (1) an identification module, stored in memory, that identifies a request from a user to complete an authentication process on the computing device via a facial-recognition system, (2) a sending module, stored in memory, that sends the user a randomized unique identifier to display to a camera on the computing device, (3) an observation module, stored in memory, that simultaneously observes, via the camera on the computing device, both the user and the randomized unique identifier that was sent to the user, (4) an authentication module, stored in memory, that authenticates the observed user in response to determining both that the observed user's facial characteristics match facial characteristics of the user stored in the facial-recognition system and that the observed randomized unique identifier matches the randomized unique identifier sent to the user, and (5) at least one physical processor configured to execute the identification module, the sending module, the observation module, and the authentication module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a request from a user to complete an authentication process on the computing device via a facial-recognition system, (2) send the user a randomized unique identifier to display to a camera on the computing device, (3) simultaneously observe, via the camera on the computing device, both the user and the randomized unique identifier that was sent to the user, and (4) authenticate the observed user in response to determining both that the observed user's facial characteristics match facial characteristics of the user stored in the facial-recognition system and that the observed randomized unique identifier matches the randomized unique identifier sent to the user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
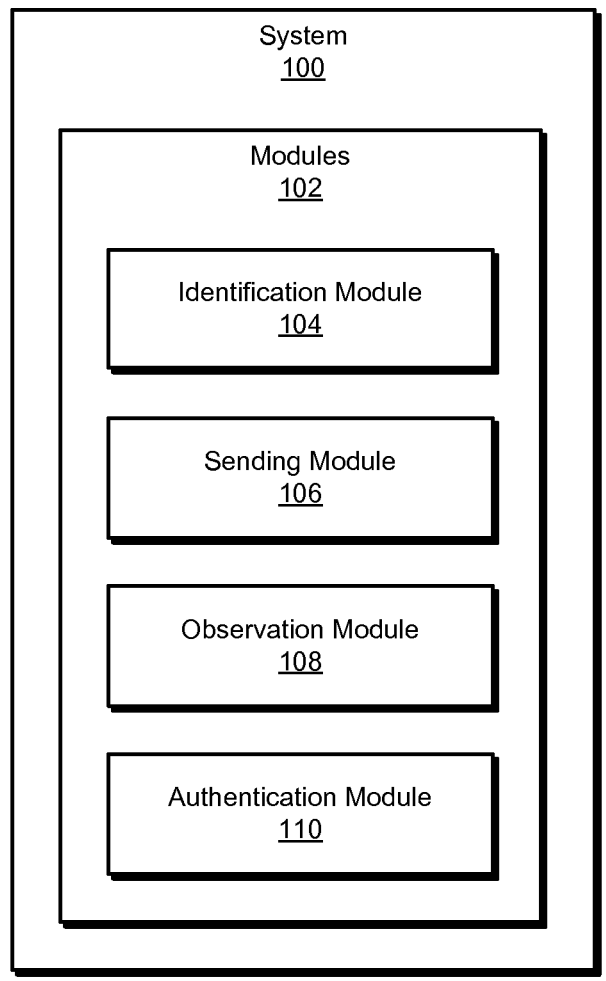
FIG. 1 is a block diagram of an exemplary system for securely authenticating users via facial recognition.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for securely authenticating users via facial recognition. As will be explained in greater detail below, by generating a unique identifier for each authentication attempt and requiring the identifier to be displayed alongside the user's face, the systems and methods described herein may be secure against replay attacks.

Figure 2:
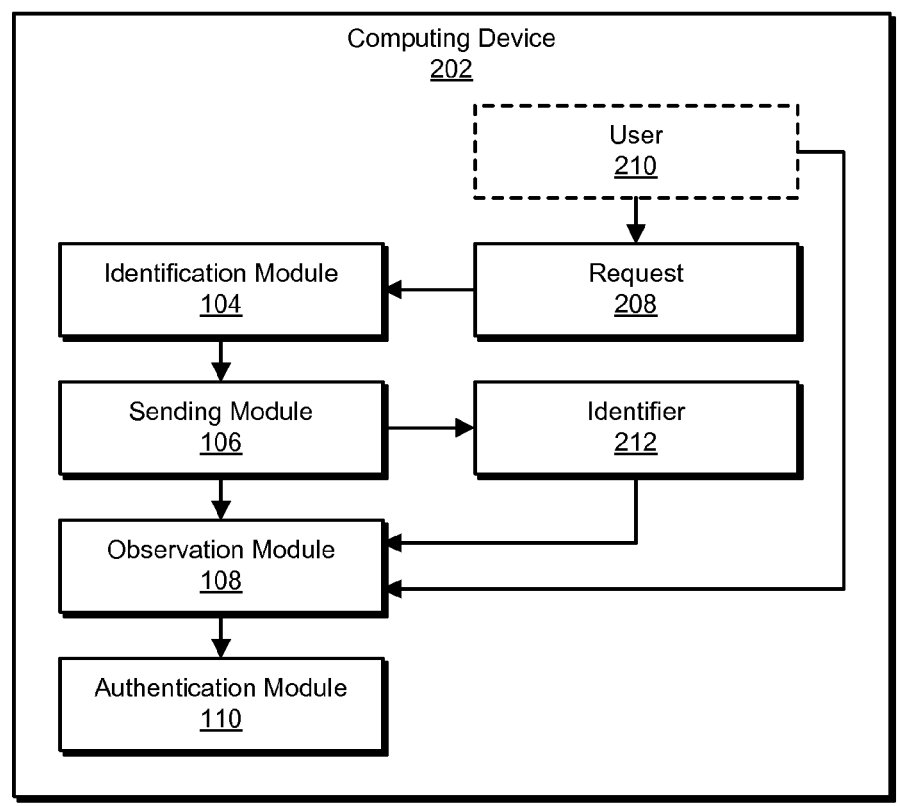
FIG. 2 is a block diagram of an additional exemplary system for securely authenticating users via facial recognition.
Figure 3:
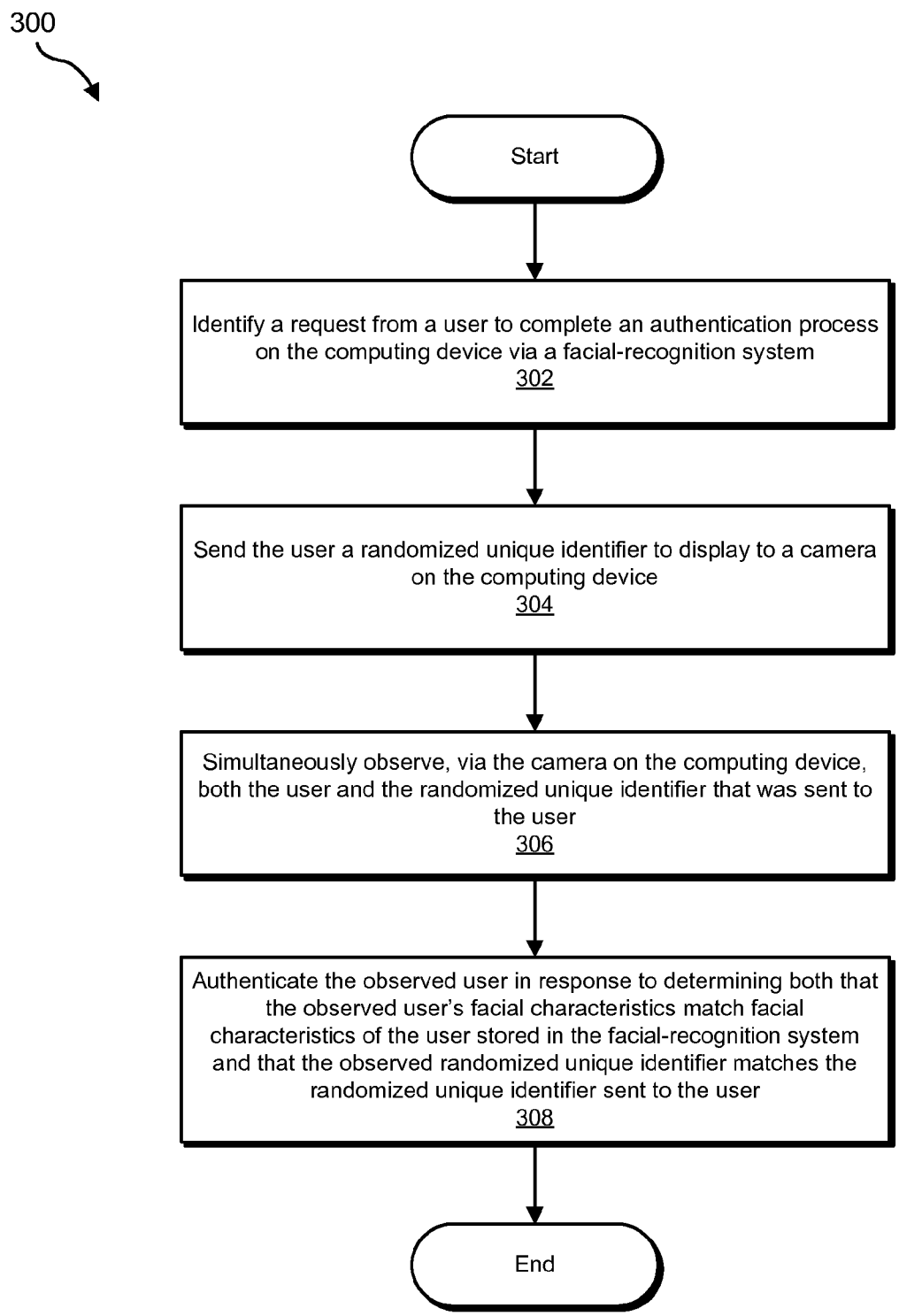
FIG. 3 is a flow diagram of an exemplary method for securely authenticating users via facial recognition.
Figure 4:
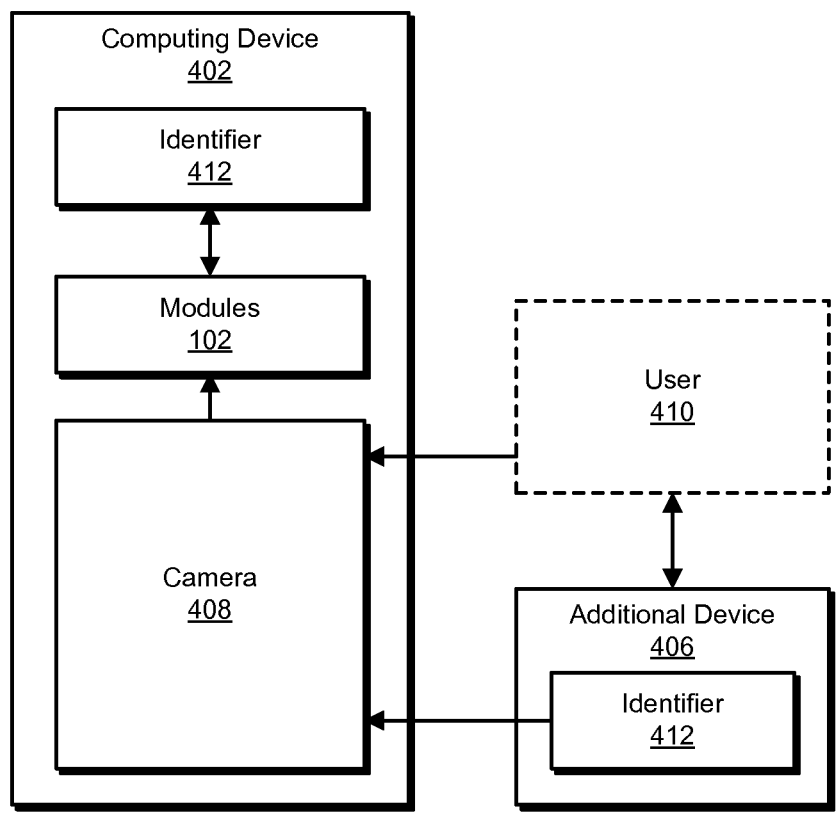
FIG. 4 is a block diagram of an exemplary computing system for securely authenticating users via facial recognition.
Figure 5:
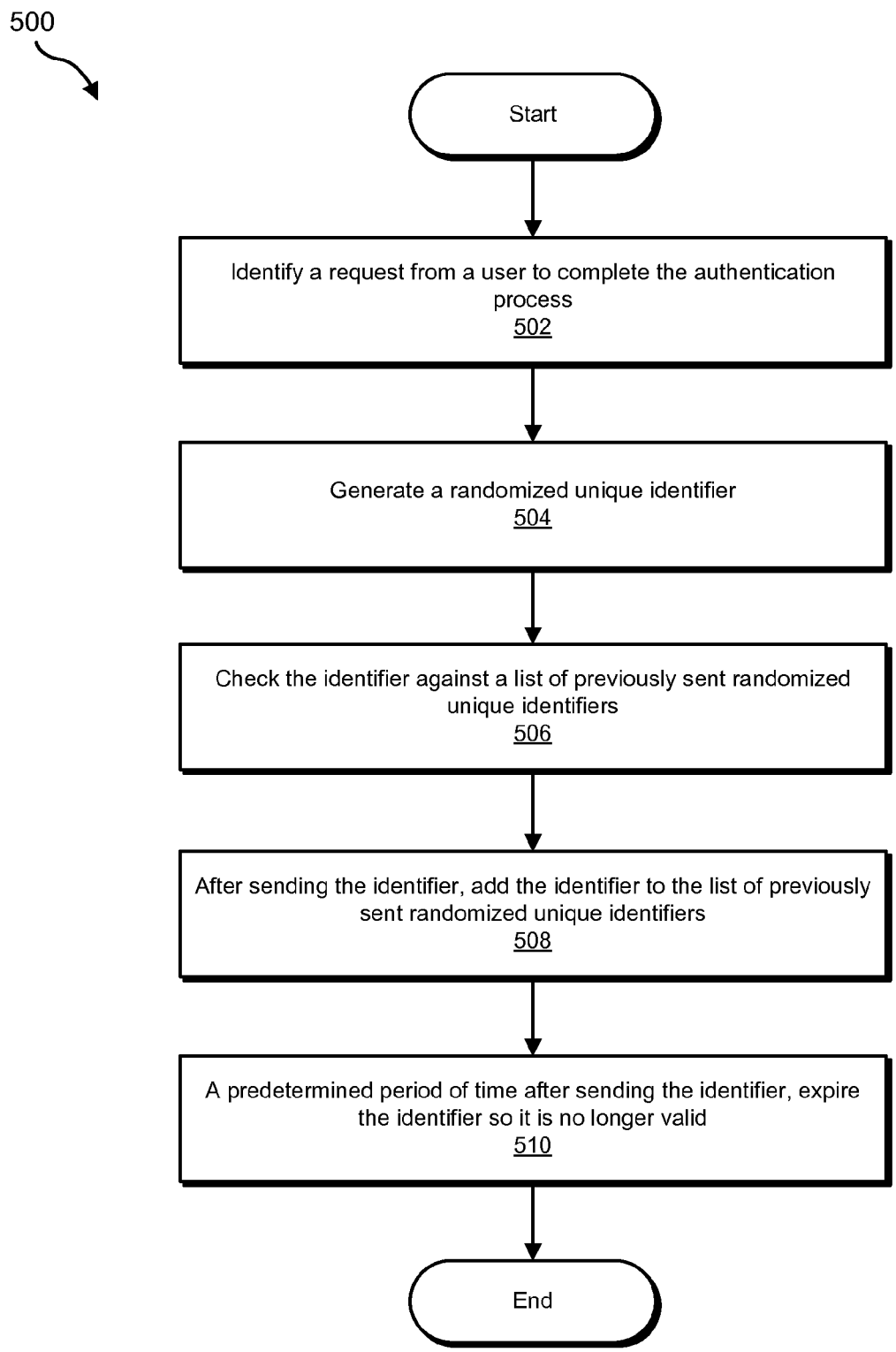
FIG. 5 is a flow diagram of an exemplary method for securely authenticating users via facial recognition.

The following will provide, with reference to FIGS. 1, 2, and 4 detailed descriptions of exemplary systems for securely authenticating users via facial recognition. Detailed descriptions of corresponding computer-implemented methods will also be provided in connection with FIGS. 3 and 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for securely authenticating users via facial recognition. As illustrated in this figure, exemplary system 100 may include one or more modules 102 for performing one or more tasks. For example, and as will be explained in greater detail below, exemplary system 100 may include an identification module 104 that identifies a request from a user to complete an authentication process on the computing device via a facial-recognition system. Exemplary system 100 may additionally include a sending module 106 that sends the user a randomized unique identifier to display to a camera on the computing device. Exemplary system 100 may also include an observation module 108 that simultaneously observes, via the camera on the computing device, both the user and the randomized unique identifier that was sent to the user. Exemplary system 100 may additionally include an authentication module 110 that authenticates the observed user in response to determining both that the observed user's facial characteristics match facial characteristics of the user stored in the facial-recognition system and that the observed randomized unique identifier matches the randomized unique identifier sent to the user. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device. In one example, computing device 202 may be programmed with one or more of modules 102.

In one embodiment, one or more of modules 102 from FIG. 1 may, when executed by at least one processor of computing device 202, enable computing device 202 to securely authenticate users via facial recognition. For example, and as will be described in greater detail below, identification module 104 may identify a request 208 from a user 210 to complete an authentication process on computing device 202 via a facial-recognition system. Next, sending module 106 may send user 210 an identifier 212 to display to a camera on computing device 202. Shortly thereafter, observation module 108 may simultaneously observe, via the camera on computing device 202, both user 210 and identifier 212 that was sent to user 210. Authentication module 110 may then authenticate the observed user 210 in response to determining both that the observed user's facial characteristics match facial characteristics of user 210 stored in the facial-recognition system and that the observed identifier matches identifier 212 sent to user 210.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

FIG. 3 is a flow diagram of an exemplary computer-implemented method 300 for securely authenticating users via facial recognition. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify a request from a user to complete an authentication process on the computing device via a facial-recognition system. For example, identification module 104 may, as part of computing device 202 in FIG. 2, identify request 208 from user 210 to complete an authentication process on computing device 202 via a facial-recognition system.

The term "request," as used herein, generally refers to any indication that a user is attempting to authenticate. In some embodiments, a request may include a user turning on a computing device. In other embodiments, a request may include a user typing a username and/or personal identification number, clicking an icon, swiping a screen, and/or pressing a button. Additionally or alternatively, a request may be generated by a computing device and/or application on a user's behalf. For example, a user may launch an application that requires authentication and the application may send the request to the authentication system.

The term "authentication process," as used herein, generally refers to any process that identifies a user as the individual with whom an account is associated. For example, an authentication process may log a user into a user account on a computing device. In another example, an authentication process may log a user into a profile on an online service. Additionally or alternatively, an authentication process may log a user into a user account on an application.

The term "facial-recognition system," as used herein, generally refers to any authentication system that is based at least in part on identifying facial characteristics of a user via a camera. In some embodiments, a facial-recognition system may store a set of facial features for a user and may authenticate a user after matching the stored set of facial characteristics to the facial characteristics of the user that is attempting to authenticate. In some embodiments, a facial-recognition system may include additional components, such as a username, a password, a security question, a personal identification number, a voice recognition system, and/or a fingerprint scanner.

Identification module 104 may identify the request in a variety of contexts. For example, identification module 104 may identify a request to authenticate to a computing device, such as a laptop or a smartphone. In another example, identification module 104 may identify a request to authenticate to an application, such as an email application and/or a gaming application. In one example, identification module 104 may identify a request to authenticate in order to access a protected file, such as a file containing confidential data. Additionally or alternatively, identification module 104 may identify a request to authenticate to an online service, such as a banking website.

At step 304, one or more of the systems described herein may send the user a randomized unique identifier to display to a camera on the computing device. For example, sending module 106 may, as part of computing device 202 in FIG. 2, send user 210 an identifier 212 to display to a camera on computing device 202.

The term "randomized unique identifier," as used herein, generally refers to any piece of information that is capable of being transmitted from a computing device to a user and then from the user to a computing device. For example, a randomized unique identifier may include an image and/or a video that may be displayed to the user on an additional computing device and then displayed to the original computing device by the user. In one embodiment, an image may include a randomly-generated quick response (QR) code and/or a video may include an animated QR code (e.g., a rotating QR code). In another example, a randomized unique identifier may include a gesture that may be described to a user by a computing device and then performed for the camera on a computing device by a user. Additionally or alternatively, a randomized unique identifier may include a code that may be displayed to a user by a computing device and then entered into the computing device by the user.

Sending module 106 may send the randomized unique identifier in a variety of ways. In one embodiment, sending module 106 may send the randomized unique identifier by displaying an image and/or a video on an additional computing device near the user. For example, a user may be authenticating to their smartphone and sending module 106 may display an image on the user's smartwatch. In another example, a user may be authenticating to their desktop computer and sending module 106 may play a video on the user's smartphone.

In some embodiments, sending module 106 may send the randomized unique identifier by describing a gesture to the user. For example, sending module 106 may play a video of a model performing the gesture. In another example, sending module 106 may describe the gesture using still images and/or text. For example, sending module 106 may display the text, "nod twice, then wink your left eye" in order to send the gesture to the user.

At step 306, one or more of the systems described herein may simultaneously observe, via the camera on the computing device, both the user and the randomized unique identifier that was sent to the user. For example, observation module 108 may, as part of computing device 202 in FIG. 2, simultaneously observe, via the camera on computing device 202, both user 210 and identifier 212 that was sent to user 210.

Observation module 108 may observe the randomized unique identifier in a variety of contexts. For example, observation module 108 may observe the randomized unique identifier being displayed next to the user's face (e.g., if the randomized unique identifier is an image or video). In another example, observation module 108 may observe the randomized unique identifier while analyzing the user's facial characteristics (e.g., if the randomized unique identifier is a facial gesture such as a wink).

In one embodiment, the randomized unique identifier may include an image and/or a video and sending module 106 may send the user the randomized unique identifier by displaying the image or the video on an additional computing device in proximity to the user. In this embodiment, observation module 108 may observe both the user and the randomized unique identifier by observing the image or the video displayed on the additional computing device. As illustrated in FIG. 4, a user 410 may own a computing device 402 and own and/or be in proximity to an additional device 406. In some embodiments, computing device 402 may execute some or all of modules 102, may include a camera 408, and/or may be expecting to observe an identifier 412. Additional device 406 may receive identifier 412 from sending module 106 and may display identifier 412 in a variety of ways. For example, identifier 412 may be a video that additional device 406 may play on a screen. In some examples, user 410 may complete an authentication process by holding additional device 406 so that identifier 412 as displayed on additional device 406 is visible to camera 408 at the same time as user 410's face is visible to camera 408. In this example, observation module 108 on computing device 402 may simultaneously observe identifier 412 and user 410.

In one embodiment, the randomized unique identifier may include a gesture and sending module 106 may send the user the randomized unique identifier by sending the user instructions for performing the gesture. In this embodiment, observation module 108 may observe both the user and the randomized unique identifier by observing the user performing the gesture. Examples of gestures may include, without limitation, nodding, smiling, frowning, winking, blinking, sticking out the tongue, head shaking, eye rolling, hand gestures, and/or any combination of any number of the previous examples. For example, a gesture may be, "make the OK sign with your right hand," "blink once," and/or "nod three times and stick out your tongue."

Returning to FIG. 3, at step 308, one or more of the systems described herein may authenticate the observed user in response to determining both that the observed user's facial characteristics match facial characteristics of the user stored in the facial-recognition system and that the observed randomized unique identifier matches the randomized unique identifier sent to the user. For example, authentication module 110 may, as part of computing device 202 in FIG. 2, authenticate the observed user 210 in response to determining both that the observed user's facial characteristics match facial characteristics of user 210 stored in the facial-recognition system and that the observed identifier matches identifier 212 sent to user 210.

Authentication module 110 may authenticate the user in a variety of contexts. For example, authentication module 110 may authenticate the user to a computing device. In another example, authentication module 110 may authenticate the user to an application. Additionally or alternatively, authentication module 110 may authenticate the user to an online service.

In one embodiment, the systems described herein may expire the randomized unique identifier after a predetermined period of time and authentication module 110 may fail to authenticate the observed user in response to determining that the randomized unique identifier has expired. For example, the systems described herein may expire the randomized unique identifier after ten minutes. If the user attempts to authenticate using the identifier after ten minutes have elapsed, authentication module 110 may fail to authenticate the user. Expiring the identifier in this way may prevent attackers from capturing the identifier and using it to authenticate as the user.

In some embodiments, the systems described herein may store a representation of the randomized unique identifier in a stored set of representations of previously sent randomized unique identifiers. For example, the systems described herein may create a hash, signature, and/or fingerprint of the randomized unique identifier to store in the list. If the randomized unique identifier is a gesture, the representation of the gesture may be text describing the gesture, such as "nod twice."

In some examples, sending module 106 may send the user the randomized unique identifier by first checking the representation of the randomized unique identifier against the stored set of representations of previously sent randomized unique identifiers in order to avoid re-sending a previously sent randomized unique identifier. In some embodiments, the systems described herein may remove the representation of the randomized unique identifier from the stored set of previously sent randomized unique identifiers after a predetermined period of time has passed since the randomized unique identifier was sent to the user. For example, an identifier may be removed from the list one month after the identifier was originally sent to the user.

In some embodiments, the systems described herein may both expire identifiers after a predetermined time period and log previously used identifiers to prevent re-use. As illustrated in method 500 in FIG. 5, at step 502, the systems described herein may identify a request from a user to complete an authentication process. For example, a user may be attempting to authenticate to a laptop. At step 504, the systems described herein may generate a randomized unique identifier. For example, the systems described herein may randomly generate a QR code. At step 506, the systems described herein may check the identifier against a list of previously sent randomized unique identifiers. For example, the systems described herein may check a hash of the QR code against the stored hashes of previously sent QR codes in order to verify that the QR code has not previously been sent. At step 508, the systems described herein may, after sending the identifier, add the identifier to the list of previously sent identifiers. For example, the systems described herein may add the hash of the QR code to the list of hashes of previously sent QR codes. In some embodiments, at step 510, the systems described herein may, a predetermined period of time after sending the identifier, expire the identifier so that it is no longer valid. For example, the systems described herein may expire the QR code five minutes after sending it.

As explained in connection with method 300 above, the systems described herein may combine facial recognition with a dynamic, on-demand identifier provided by the authenticating service to be included by the entity requesting authentication as part of the authentication request. This dynamic identifier may be transmitted to the user on any device in the user's vicinity. In one example, the identifier may be transmitted to a smart phone or wearable device on the user's person. In another example, if the user is authenticating on their mobile phone, the identifier may be transmitted to a computer monitor at the user's desk in the background. In another embodiment, the authenticating service may prevent replay attacks by requesting that the user perform a dynamic gesture, such as nodding, winking, and/or shaking their head. The addition of a dated, dynamic identifier in the authentication request may date the image, allowing the authenticating service to expire the image and prevent replay attacks. By preventing replay attacks, the systems described herein may make facial-recognition systems increasingly secure without significantly decreasing the convenience of authenticating via such systems.

Figure 6:
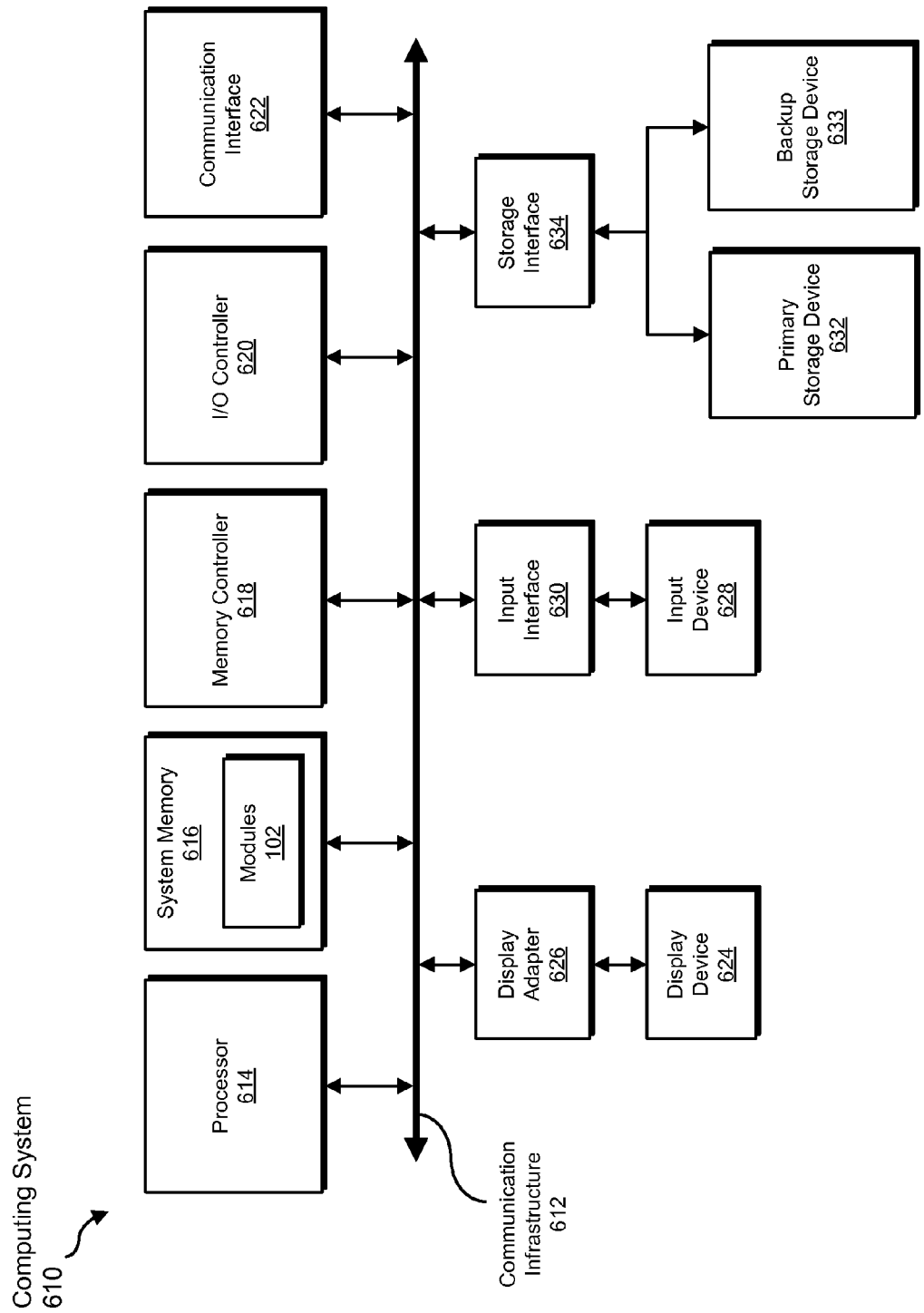
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
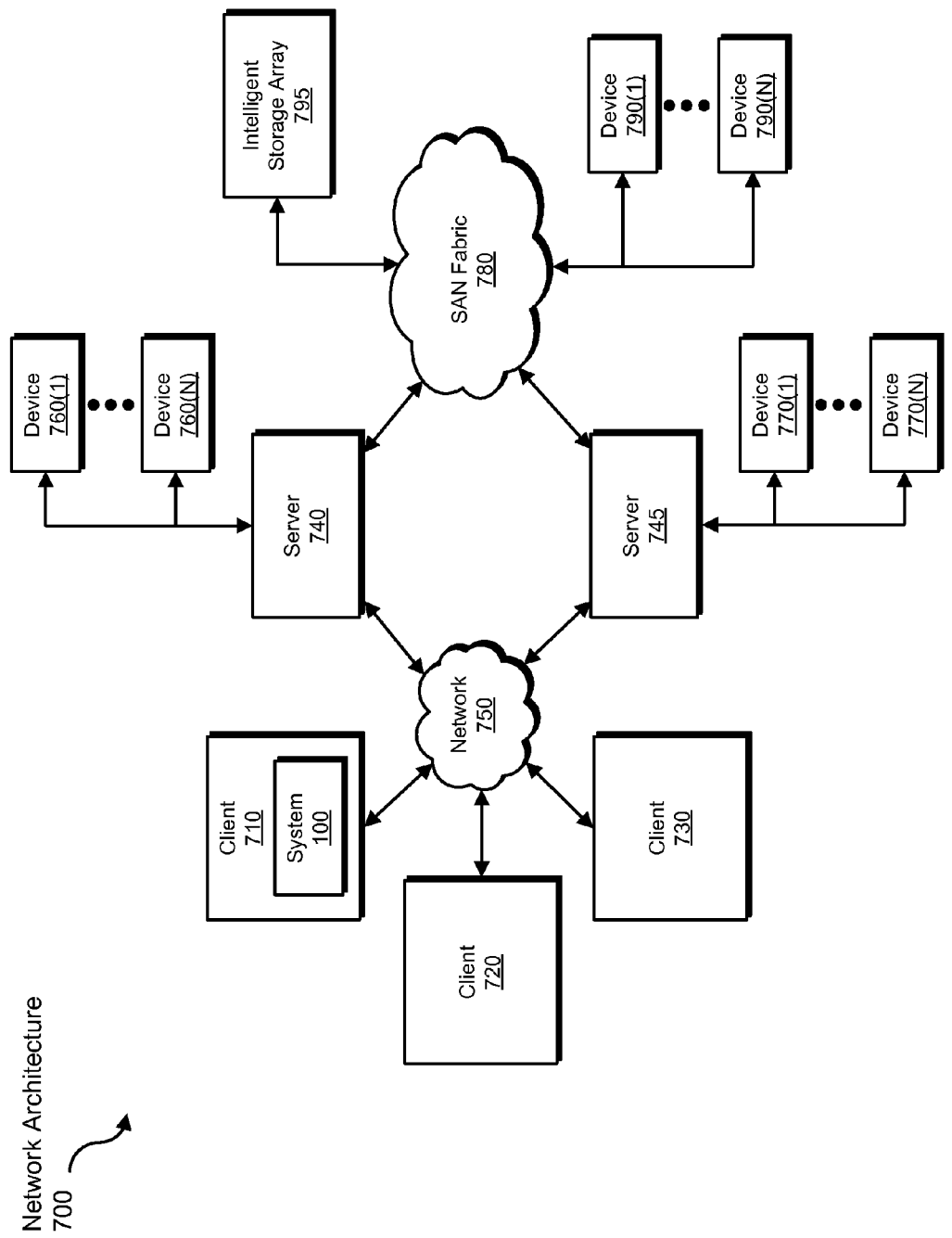
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for securely authenticating users via facial recognition.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive authentication data to be transformed, transform the authentication data into a randomized unique identifier and facial characteristics, output a result of the transformation to an authentication system, use the result of the transformation to authenticate a user, and store the result of the transformation to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for securely authenticating users via facial recognition, at least a portion of the method being performed by a computing device comprising at least one processor, the method comprising:
   identifying a request from a user to complete an authentication process on the computing device via a facial-recognition system;
   sending, to a separate computing device controlled by the user, a randomized animated QR code for the user to display to a camera on the computing device;
   simultaneously observing, via the camera on the computing device, both the user and the randomized animated QR code displayed on the separate computing device controlled by the user; and
   authenticating the observed user in response to determining both that the observed user's facial characteristics match facial characteristics of the user stored in the facial-recognition system and that the observed randomized animated QR code matches the randomized animated QR code sent to the separate computing device controlled by the user.

2. The computer-implemented method of claim 1, further comprising:
   expiring the randomized animated QR code after a predetermined period of time; and
   failing to authenticate the observed user in response to determining that the animated QR code has expired.

3. The computer-implemented method of claim 1, further comprising storing a representation of the randomized animated QR code in a stored set of representations of previously sent randomized animated QR codes.

4. The computer-implemented method of claim 3, wherein sending the user the randomized animated QR code comprises checking the representation of the randomized animated QR code against the stored set of representations of previously sent randomized animated QR codes in order to avoid re-sending a previously sent randomized animated QR code.

5. The computer-implemented method of claim 3, further comprising removing the representation of the randomized animated QR code from the stored set of previously sent randomized animated QR codes after a predetermined period of time has passed since the randomized animated QR code was sent to the user.

6. The computer-implemented method of claim 1, wherein
   sending, to a separate computing device controlled by the user, the randomized animated QR code comprises displaying the randomized animated QR code on the separate computing device in proximity to the user; and
   observing both the user and the randomized animated QR code comprises observing the randomized animated QR code displayed on the separate computing device.

7. The computer-implemented method of claim 1, further comprising:
   sending the user instructions for performing a gesture; and
   observing both the user and the randomized animated QR code comprises observing the user performing the gesture.

8. A system for securely authenticating users via facial recognition, the system comprising:
   an identification module, stored in memory, that identifies a request from a user to complete an authentication process on the computing device via a facial-recognition system;
   a sending module, stored in memory, that sends, to a separate computing device controlled by the user, a randomized animated QR code to display to a camera on the computing device;
   an observation module, stored in memory, that simultaneously observes, via the camera on the computing device, both the user and the randomized animated QR code displayed on the separate computing device controlled by the user;
   an authentication module, stored in memory, that authenticates the observed user in response to determining both that the observed user's facial characteristics match facial characteristics of the user stored in the facial-recognition system and that the observed randomized animated QR code matches the randomized animated QR code sent to the separate computing device controlled by the user; and
   at least one physical processor configured to execute the identification module, the sending module, the observation module, and the authentication module.

9. The system of claim 8, wherein:
   the sending module expires the randomized animated QR code after a predetermined period of time; and
   the authentication module fails to authenticate the observed user in response to determining that the randomized animated QR code has expired.

10. The system of claim 8, wherein the sending module stores a representation of the randomized animated QR code in a stored set of representations of previously sent randomized animated QR codes.

11. The system of claim 10, wherein the sending module sends the user the randomized animated QR code by checking the representation of the randomized animated QR code against the stored set of representations of previously sent randomized animated QR codes in order to avoid re-sending a previously sent randomized animated QR code.

12. The system of claim 10, wherein the sending module removes the representation of the randomized animated QR code from the stored set of previously sent randomized animated QR codes after a predetermined period of time has passed since the randomized animated QR code was sent to the user.

13. The system of claim 8, wherein:
the sending module sends the user the randomized animated QR code by displaying the randomized animated QR code on an additional computing device in proximity to the user; and
the observation module observes both the user and the randomized animated QR code by observing the randomized animated QR code displayed on the additional computing device.

14. The system of claim 8, wherein:
the sending module further sends the user instructions for performing a gesture; and
the observation module observes both the user and the randomized animated QR code by observing the user performing the gesture.

15. A non-transitory computer-readable medium comprising one or more computer-readable instructions that, when executed by at least one processor of a computing device, cause the computing device to:
identify a request from a user to complete an authentication process on the computing device via a facial-recognition system;
send, to a separate computing device controlled by the user, a randomized animated QR code to display to a camera on the computing device;
simultaneously observe, via the camera on the computing device, both the user and the randomized animated QR code displayed on the separate computing device controlled by the user; and
authenticate the observed user in response to determining both that the observed user's facial characteristics match facial characteristics of the user stored in the facial-recognition system and that the observed randomized animated QR code matches the randomized animated QR code sent to the separate computing device controlled by the user.

16. The non-transitory computer-readable medium of claim 15, wherein the one or more computer-readable instructions cause the computing device to:
expire the randomized animated QR code after a predetermined period of time; and
fail to authenticate the observed user in response to determining that the randomized animated QR code has expired.

17. The non-transitory computer-readable medium of claim 15, wherein the one or more computer-readable instructions cause the computing device to store a representation of the randomized animated QR code in a stored set of representations of previously sent randomized animated QR codes.

18. The non-transitory computer-readable medium of claim 17, wherein the one or more computer-readable instructions cause the computing device to send the user the randomized animated QR code by checking the representation of the randomized animated QR code against the stored set of representations of previously sent randomized animated QR codes in order to avoid re-sending a previously sent randomized animated QR code.

19. The non-transitory computer-readable medium of claim 17, wherein the one or more computer-readable instructions cause the computing device to remove the representation of the randomized animated QR code from the stored set of previously sent randomized animated QR codes after a predetermined period of time has passed since the randomized animated QR code was sent to the user.

20. The non-transitory computer-readable medium of claim wherein:
sending, to a separate computing device controlled by the user, the randomized animated QR code comprises displaying the randomized animated QR code on the separate computing device in proximity to the user;
observing both the user and the randomized animated QR code comprises observing the randomized animated QR code displayed on the additional computing device.

* * * * *